United States Patent

Helgren

Patent Number: 5,551,906
Date of Patent: Sep. 3, 1996

[54] CALIPER ASSEMBLY FOR GRINDER

[75] Inventor: Dale Helgren, Green Bay, Wis.

[73] Assignee: Voith Sulzer Paper Technology North America Inc., Appleton, Wis.

[21] Appl. No.: 344,095

[22] Filed: Nov. 23, 1994

[51] Int. Cl.⁶ ................................................. B24B 49/00
[52] U.S. Cl. ............................. 451/8; 33/501.02; 73/105
[58] Field of Search ............................... 451/6, 5, 8, 49, 451/408; 33/501.02, 501.04, 783, 784, 803, 805, 811, 555.1, 558.01, 558.04; 73/105, 863, 104

[56] References Cited

U.S. PATENT DOCUMENTS

| | | | |
|---|---|---|---|
| 3,391,497 | 7/1968 | Parrella et al. | 451/14 |
| 4,053,237 | 10/1977 | Casey | 451/6 |
| 4,291,466 | 9/1981 | Bell et al. | 33/501.04 |
| 4,399,639 | 8/1983 | Lessway | 451/408 |
| 4,437,239 | 3/1984 | Possati | 33/501.02 |
| 4,480,412 | 11/1984 | Shank et al. | 33/501.04 |
| 4,693,038 | 9/1987 | Vetter | 51/165.72 |
| 4,807,400 | 2/1989 | Corallo et al. | 524/752 |
| 4,811,524 | 3/1989 | Corallo | 451/9 |
| 4,903,413 | 2/1990 | Bellwood | 33/555.1 |
| 4,958,442 | 9/1990 | Eckhardt | 33/555.1 |
| 5,099,585 | 3/1992 | Liskow | 33/555.1 |

OTHER PUBLICATIONS

Japanese Patent Publication No. 347020558A (47–20558) filed 10 Jun. 1972.

Primary Examiner—D. S. Meislin
Assistant Examiner—Andrew Weinberg
Attorney, Agent, or Firm—Ostrolenk, Faber, Gerb & Soffen, LLP

[57] ABSTRACT

A caliper assembly for a grinding apparatus includes a pair of spaced apart, moveable, caliper arms for measuring a dimension of a workpiece held in the grinding apparatus. The caliper arms are independently movable. Each has a dimension measuring probe for contacting a workpiece surface and measuring a dimension of the workpiece. An inspecting device located at an end of one caliper arm for inspecting characteristics of the workpiece surface is supported spaced from the dimension measuring probe and so that the surface inspecting device is located at a desired, fixed distance from the workpiece surface when the dimension measuring probe contacts the workpiece surface. The surface inspecting device is movably adjusted in accordance with the adjustments of the caliper arm so that the surface inspecting device is accurately located at a constant distance from the surface of the workpiece. In one embodiment, the inspecting device is on the inward facing surface of one of the caliper arms. In another embodiment, the inspecting device is on the outward facing surface of one of the caliper arms.

16 Claims, 4 Drawing Sheets

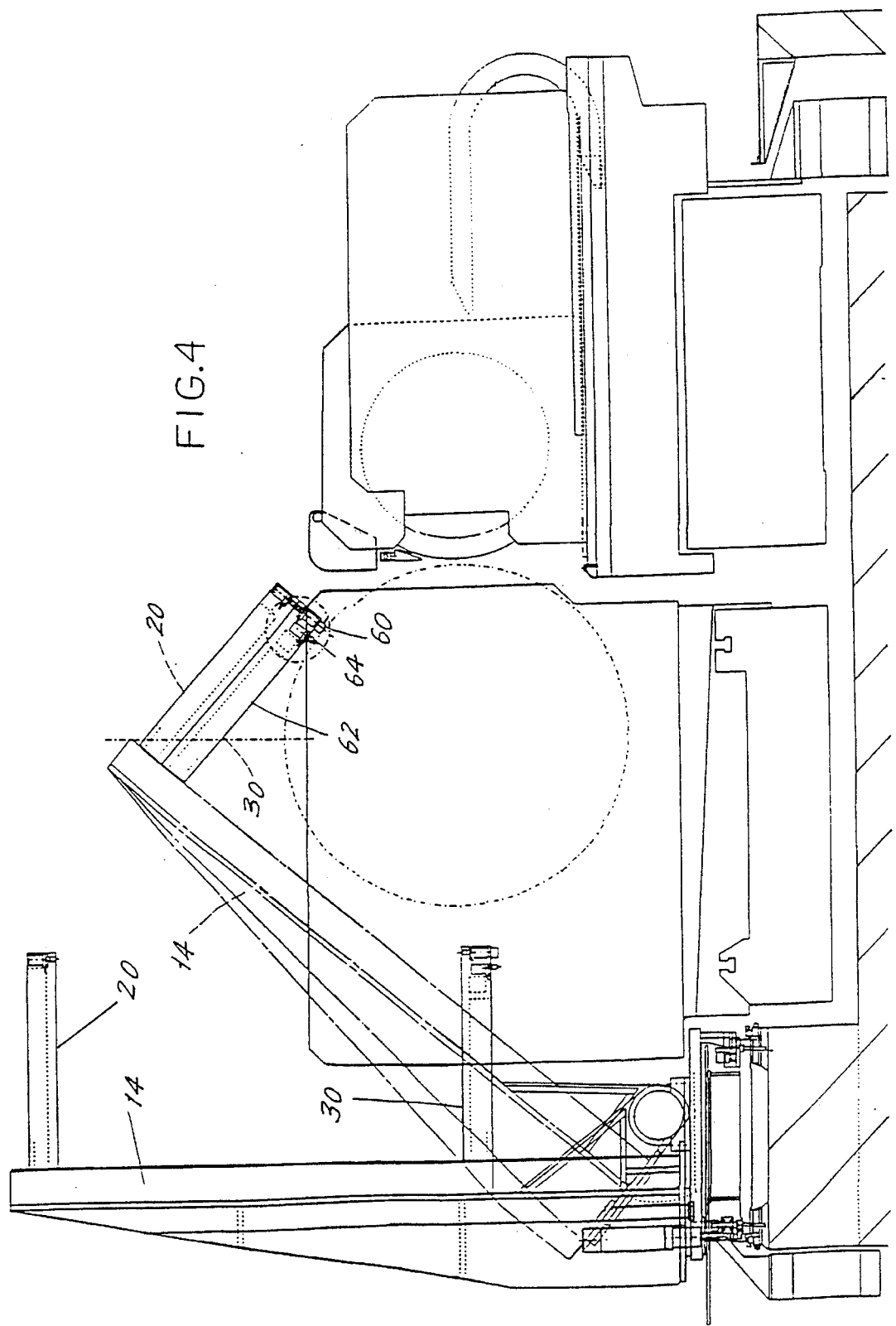

CALIPER ASSEMBLY FOR GRINDER

BACKGROUND OF THE INVENTION

The present invention relates to a caliper assembly for a grinder, and more particularly to a caliper assembly including a workpiece surface inspecting device that can be maintained at a constant distance from the workpiece surface.

In a conventional grinder, such as those disclosed in U.S. Pat. Nos. 3,391,497; 4,807,400 and 4,811,524, a substantially cylindrical workpiece to be ground is held in a headstock and tailstock so that a grinding wheel can contact the surface of the workpiece. After the workpiece has been positioned in the grinder, a pair of spaced apart, workpiece measuring caliper arms are moved from their non-measuring position away from the workpiece into their measuring positions at opposite locations around the workpiece. The workpiece measuring caliper arms are moved, usually simultaneously, possibly by a single lead screw assembly or by individual controls to each caliper arm, into the measuring position. The caliper arms measure a dimension of the workpiece, such as a diameter of the generally circular workpiece. Each caliper arm has a probe which contacts the surface of the workpiece and signals when such contact occurs. Then, a dimension of the workpiece, such as a diameter, is measured by calculating a distance between the two distance measuring devices on the caliper arms.

The caliper assembly disclosed in the latter two patents also includes devices for inspecting for structural defects and surface roughness the same region along the workpiece surface at which the dimension is being measured. This inspection is performed while the workpiece surface is being measured and while the grinding occurs. The workpiece surface inspecting devices are typically contactless measuring instruments, which do not contact the workpiece and thus make their inspections from a distance away from the workpiece. In the above prior patents, the inspecting devices are located on an independent telescoping member or arm which is attached to a frame that carries the caliper arms so that the surface inspecting devices are located between the two caliper arms. The telescoping member moves the surface inspecting devices toward the surface of the cylindrical workpiece to a preset surface inspecting position which likely remains constant during the inspections.

The location and fixed measuring position of conventional surface inspecting devices have several disadvantages. They are not fixed to a measurement transducer system so that the operator would not know how near to or far away from the workpiece surface the surface inspection devices are positioned. The initial fixed position of the surface inspecting devices during the inspecting process causes the spacing between the surface inspecting devices and the workpiece surface to vary according to machine tolerances, workpiece surface variations and accuracy of the mounting of the workpiece in the grinder. Unless each workpiece is mounted in the exact same position on the headstock and tailstock of the grinder, variations in the distance between the surface inspecting devices and the workpiece surface will occur.

Variations in the distance between the surface inspecting devices and the workpiece surface can cause surfaces of different workpieces to be inspected differently, which produces erroneous readings. Thus, the conventionally mounted workpiece surface inspecting devices are unable to accurately inspect a workpiece surface.

SUMMARY OF THE INVENTION

It is an object of the present invention to provide a caliper assembly for a grinder which overcomes the above disadvantages of conventional caliper assemblies.

It is also an object of the present invention to provide a workpiece surface inspecting device for a caliper assembly and which is capable of inspecting a workpiece surface while avoiding undesirable variations in readings, which would be caused, e.g. by deviations in bed alignment of a caliper assembly bed, deviations in the shape of the workpiece and/or deviations in mounting the workpiece on the assembly.

It is another object of the present invention to continuously maintain a workpiece surface inspecting device at a preset distance from a workpiece surface to obtain an accurate surface inspection.

A further object is to provide such a caliper assembly where the surface inspection device is not positioned between the caliper arms. Instead, the device may be supported on one of the caliper arms so as to be movable with that arm.

It is also an object of the present invention to provide such a caliper assembly having two caliper arms wherein the caliper arm that supports the inspection device is continuously, independently movable during the inspecting process, which occurs during the grinding process. This maintains the surface inspecting device at a constant distance away from a surface of a generally cylindrical workpiece.

The caliper assembly according to a first preferred embodiment of the present invention includes two spaced apart workpiece measuring caliper arms which straddle a cylindrical workpiece to form a measuring caliper, as is conventional. The caliper arms are connected to a frame and are moveable relative to the frame to be positioned at opposite locations around a cylindrical workpiece. A contact probe is located on each caliper arm for detecting contact between the workpiece surface and the probe and measuring means connected with the caliper arms determine a dimension of the workpiece, such as a diameter.

In the first preferred embodiment, the two caliper arms are independently movable relative to each other and to the frame. At least one of the caliper arms has a surface inspecting device positioned on the caliper arm so as to be spaced away from the surface of the workpiece by a preset distance when the contact probe on the caliper arm is in contact with the workpiece surface. The shape of the caliper arm and the locations thereon of the contact probe and the surface inspecting device achieve that result. Preferably, the inspecting device is near to the contact probe, yet outboard of that probe along the caliper arm so as not to be in the space between the caliper arms. In the first embodiment, the surface inspecting device is on the inward facing surface of the respective caliper arm, that is the surface facing toward the other caliper arm.

In a second preferred embodiment, the surface inspecting device is on one caliper arm, but in this version, it is on the outwardly facing surface of that arm, i.e. the surface facing away from the other arm. There is also a surface contact probe on the same outward facing surface of the caliper arm to ride along the surface of the workpiece and space the inspecting device off the workpiece surface by a fixed distance. With the inspecting device located as it is in this embodiment, the surface inspection cannot be performed when the two caliper arms are measuring diameter. Instead, as is the usual practice with these devices, the diameter of the workpiece is first determined between the inward facing surfaces of the caliper arms. Then the arms are moved away from the workpiece, e.g. by swinging away the frame on which the arms are carried. The inspecting device supporting caliper arm is moved along the frame so that its opposite, inspecting device carrying, outward side will face the workpiece. The frame is again moved, e.g. swung, so that the inspecting device is over the workpiece surface. The caliper arm is moved to place the contact probe against the workpiece and to space the inspecting device above the workpiece. Then the surface is inspected. When that is completed, the frame is moved or swung to move the caliper arms away from the workpiece.

Because it is independently movable, the caliper arm with the surface inspecting device and the adjacent contact probe on it continuously adjusts its position relative to the other arm and to the workpiece surface during the workpiece surface inspecting process in response to or to accommodate variations in the shape of the workpiece, deviations in the alignment of the caliper bed, imperfect placement of the workpiece on the grinder, machine part tolerances, etc. Continuous adjustment of the caliper arm repositions the surface inspecting device to maintain its constant distance away from the surface of the workpiece, thereby preventing inaccurate and inconsistent readings by the surface inspecting device.

In addition, because the surface inspecting device is mounted along a caliper arm at a desired, fixed distance from the probe which contacts the workpiece surface, variations in the position of each workpiece within the grinder do not affect the accuracy of the readings of the surface inspection device. Even if a workpiece is not accurately mounted, the surface inspection device will remain at a uniform distance from the workpiece surface thereby ensuring an accurate reading of the surface characteristics of the workpiece.

Also, by locating the surface inspecting device on one of the caliper arms, the surface inspecting device can accurately detect the surface characteristics of the cylindrical workpiece without experiencing variations due to the machine tolerances and roll variations.

other features and advantages of the present invention will become apparent from the following description of the invention which refers to the accompanying drawings.

BRIEF DESCRIPTION OF THE DRAWINGS

FIG. 4 is a side view of a second embodiment of a caliper assembly of the invention.

DETAILED DESCRIPTION OF THE PREFERRED EMBODIMENTS

Figure 1:
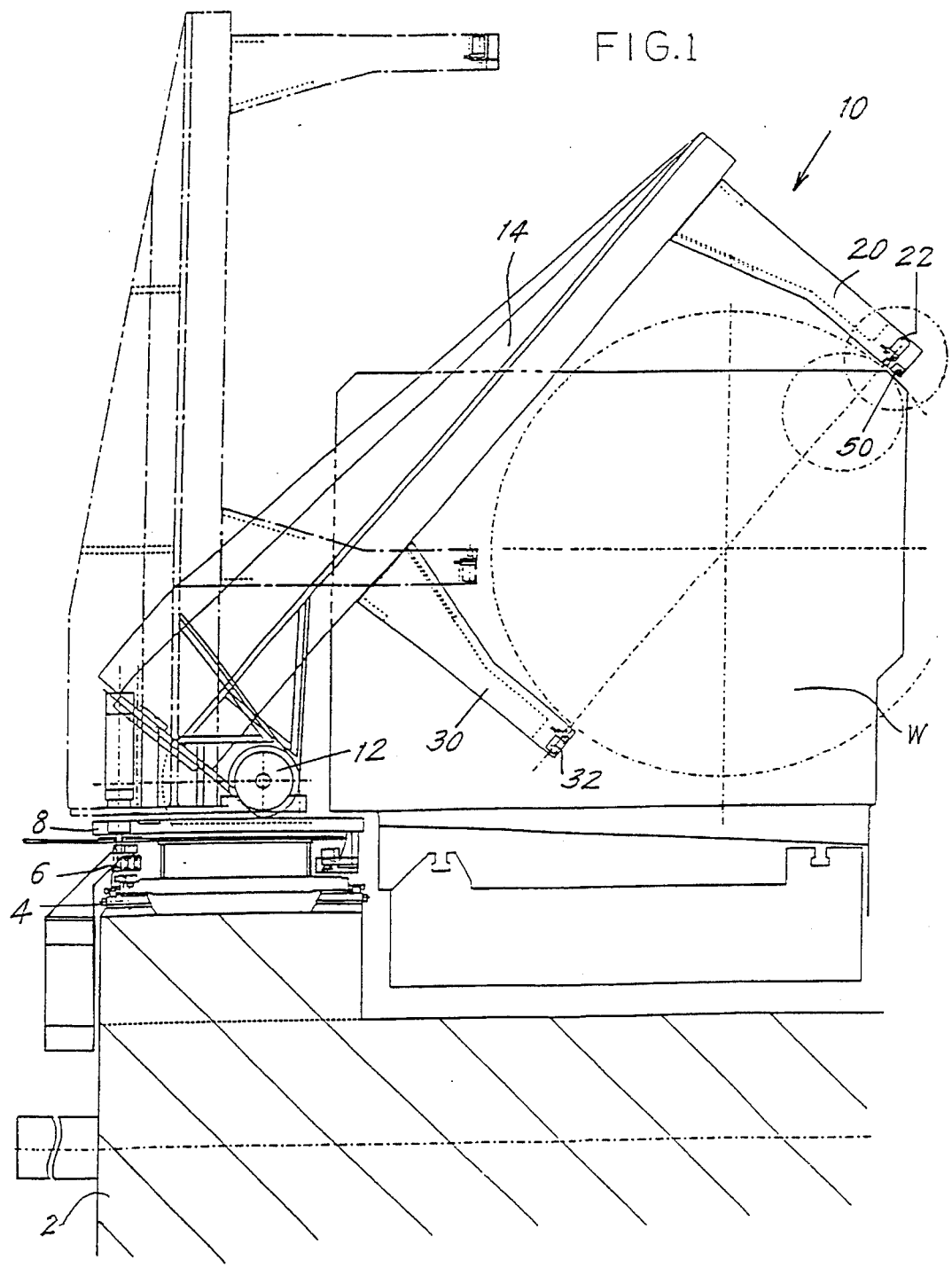
FIG. 1 is a side view of a caliper assembly according to one embodiment of the present invention.

A first preferred embodiment of a caliper assembly 10 for a workpiece grinder is shown in FIG. 1. A conventional grinding device includes a front bed 2 which is disposed parallel to a rear bed (not shown) on which a main or tail carriage (not shown) is mounted in a sliding manner and carries a grinding wheel (not shown). These features and others not described in detail or shown herein are disclosed in the above cited U.S. patents incorporated herein. On an upper surface of the front bed 2, there is a longitudinal bed 4 which has guides 6. A caliper assembly carriage 8 is mounted on the guides 6 so as to be slidable substantially parallel to a longitudinal axis of and along a surface of a substantially cylindrical workpiece W held in the grinder machine. As is conventional, the carriage 8 can be moved by an independent motorized device (not shown).

The caliper assembly 10 is mounted on to be moved with the carriage 8 along the guides 6. In addition, a pivot pin 12 secured to an upper surface of the caliper assembly carriage 8 pivotally mounts the caliper assembly 10 on the caliper assembly carriage 8. The caliper assembly 10 can be rotated manually or by an independently controlled motorized device (not shown) about the pin 12 from a non-measuring, rest position shown in broken lines in FIG. 1 to an active, measuring position shown in solid lines in FIG. 1. When it is in the measuring position, the caliper assembly arms are disposed at opposite positions around the workpiece W.

The caliper assembly 10 includes a support frame 14 connected to the pivot pin 12. The frame includes a supporting arm extending from the pin 12. A pair of workpiece measuring caliper arms 20, 30 are connected to the support frame 14. The arms are parallel and extend past diametrically opposite sides of a supported workpiece. The caliper arms 20, 30 are movable to accommodate a variety of different size workpieces and to allow for ease of positioning of the caliper assembly 10 relative to the workpiece W.

The caliper arms 20, 30 are independently, movably mounted on or in channels in the support frame 14. Each arm 20, 30 can be moved along the length of the support frame 14 by a respective independent motorized device (not shown), such as a conventional servo drive unit and along two separate drive tracks (not shown). Because each of the caliper arms 20, 30 is moved by an independent drive device, one of the caliper arms 20, 30 can be moved without the other caliper arm moving. This concept is taught in above U.S. Pat. No. 3,391,497.

Once the workpiece W has been placed in a headstock and tailstock (not shown) of the grinder, as is conventional, the support frame 14 is pivoted into the measuring position so that the caliper arms 20, 30 are positioned over opposite sides of the workpiece W. Then the caliper arms 20, 30 are each possibly simultaneously, but independently moved into a measuring position at the workpiece surface.

Figure 2:
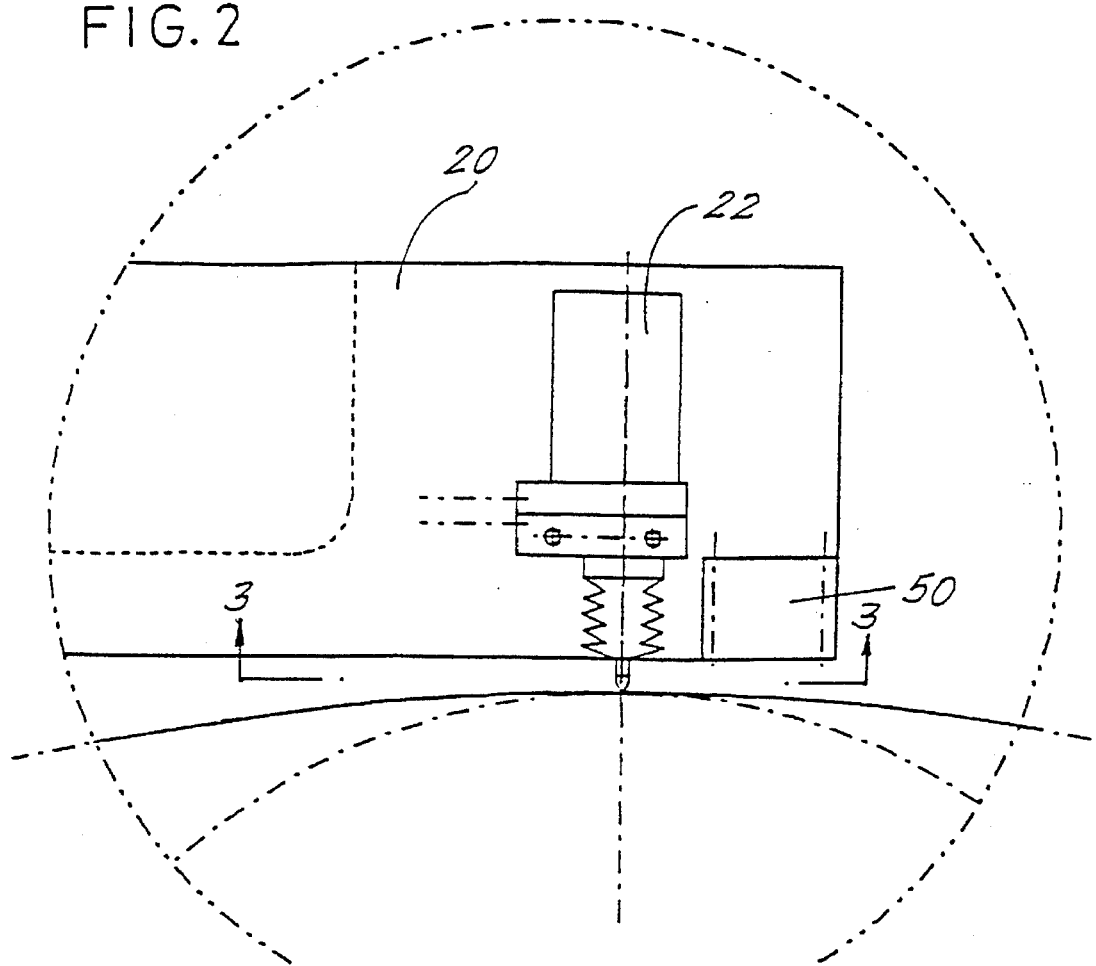
FIG. 2 is an enlarged detailed view of the end of one of the caliper arms of the caliper assembly shown in FIG. 1.

At an end of each of the caliper arms there is provided a workpiece dimension measuring device 22, 32, such as a measuring probe or roller, which contacts and rides along an outer surface of the substantially cylindrical workpiece W as the workpiece rotates. In FIG. 2, each dimension measuring device 22, 32 protrudes from the inward facing or opposed surface of and at each end of the caliper arms 20, 30 so as to contact a surface of the workpiece W when the caliper arms 20, 30 are moved into a measuring position. Once each dimension measuring device 22, 32 has contacted the surface of the workpiece W, each measuring device 22, 32 signals to a controller or transducer (not shown) that contact between the measuring devices 22, 32 and the workpiece surface has been made. Then, a dimension, such as a diameter of the workpiece, can be measured by conventional measuring means which determine a distance between the two workpiece dimension measuring devices 22, 32, as is conventional in the devices of the above patents.

Also mounted on at least one of the caliper arms 20, 30 is a workpiece surface inspecting device 50, as seen in FIGS.

2 and 3. The workpiece surface inspecting device 50 according to a preferred embodiment is mounted on the caliper arm 20 as shown in FIG. 1.

Figure 3:
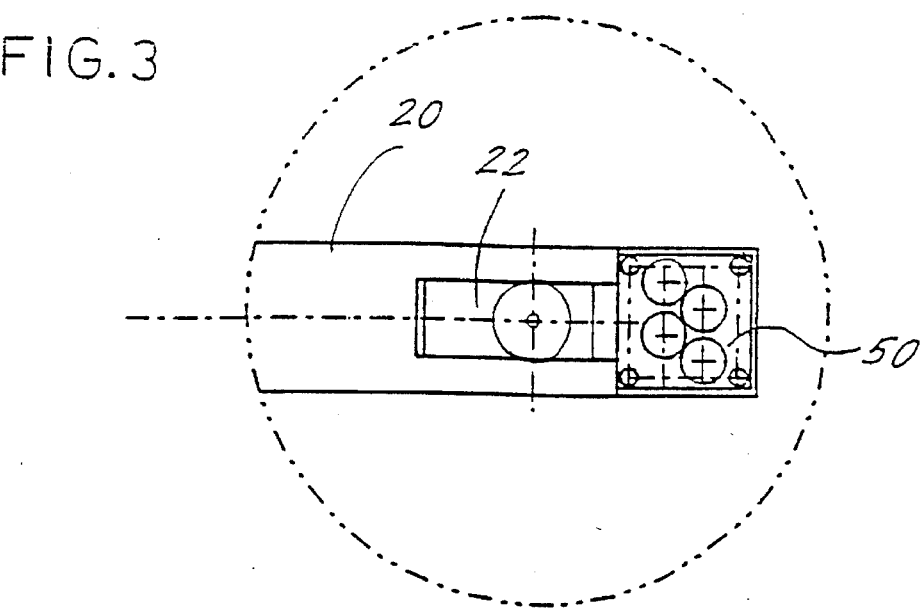
FIG. 3 is a detailed view of the end of the caliper arm shown in FIG. 2 in the direction of arrow 3.

The workpiece surface inspecting device 50 includes at least one transducer and the transducer or transducers inspect and measure the roughness of the surface of the workpiece and/or structural defects along the surface of the workpiece, etc. As seen in FIG. 3, several transducers can be provided at the end of the caliper arm 20 to together form the surface inspecting device 50 for inspecting and measuring a variety of characteristics of the workpiece surface. The number and arrangement of the transducers can be changed as needed and depending on the surface characteristics to be inspected. These surface inspecting devices are conventional and may, for example, be conventional eddy current crack and bruise detection devices, available from Sarclad International and other suppliers. The transducers of the surface inspecting device 50 are preferably of the contactless type, as described in the above patents.

The surface inspecting device 50 is preferably located adjacent to the dimension measuring device 22 and at the end of the caliper arm 20 outboard of the device 22. Alternatively, the surface inspecting device 50 can be located at any position along the caliper arm 20 as long as the surface inspecting device 50 so positioned can inspect the surface of the workpiece. If the surface inspecting device is at a different location along its caliper arm than the contact probe that supports the inspecting device off the workpiece, there might be slight unpredictability of the distance between the inspection device and the workpiece surface, dependent upon the workpiece diameter. This can be avoided by placing the inspection device at the same distance along the arm as the contact probe, e.g. they are placed side-by-side, or placing it as near to the contact probe as possible. Then the inspection device is at or at least near to the diameter defined by the opposite contact points of the two probes around the workpiece.

The surface inspecting device 50 preferably does not protrude above the surface of the caliper arm 20 beyond the dimension measuring device 22. Instead, the height of the inspecting device is selected so that when the measuring device contacts the workpiece surface, the inspecting device does not contact that surface. In a preferred embodiment, the surface inspecting device 50 does not protrude at all above the surface at the end of the caliper arm 20 and may be flush with or recessed in from the inward facing surface of the caliper arm 20. The surface inspecting device 50 is so located on the caliper arm 20 as to be spaced at a desired, fixed distance from the workpiece W when the dimension measuring device 22 is in contact with the surface of the workpiece W.

The caliper arm 20 having the surface inspecting device 50 located on it is continuously, independently adjustable relative to the other caliper arm 30 and to the workpiece surface during the inspecting process in response to variations in the shape of the workpiece W, deviations in alignment of the caliper bed, workpiece mounting inaccuracies and machine tolerances. The surface inspecting device 50 adjusts in position in accordance with the adjustments of the caliper arm 20 so that the surface inspecting device 50 is accurately located at a constant distance from the surface of the workpiece during the entire time the caliper arms 20, 30 are located in a measuring position.

In a preferred arrangement of the first embodiment, the surface inspecting device 50 is arranged on the caliper arm 20 so that a desired distance between the surface inspecting device 50 and the surface of the workpiece W is within a range of about 2 to 3 mm.

In another alternative embodiment, an additional surface inspecting device (not shown) can be mounted on the other caliper arm 30 so that each of the two caliper arms 20, 30 has a surface inspecting device 50 mounted it. Two surface inspecting devices might perform the surface inspection process more accurately and in half the time required for one inspecting device.

Figure 5:
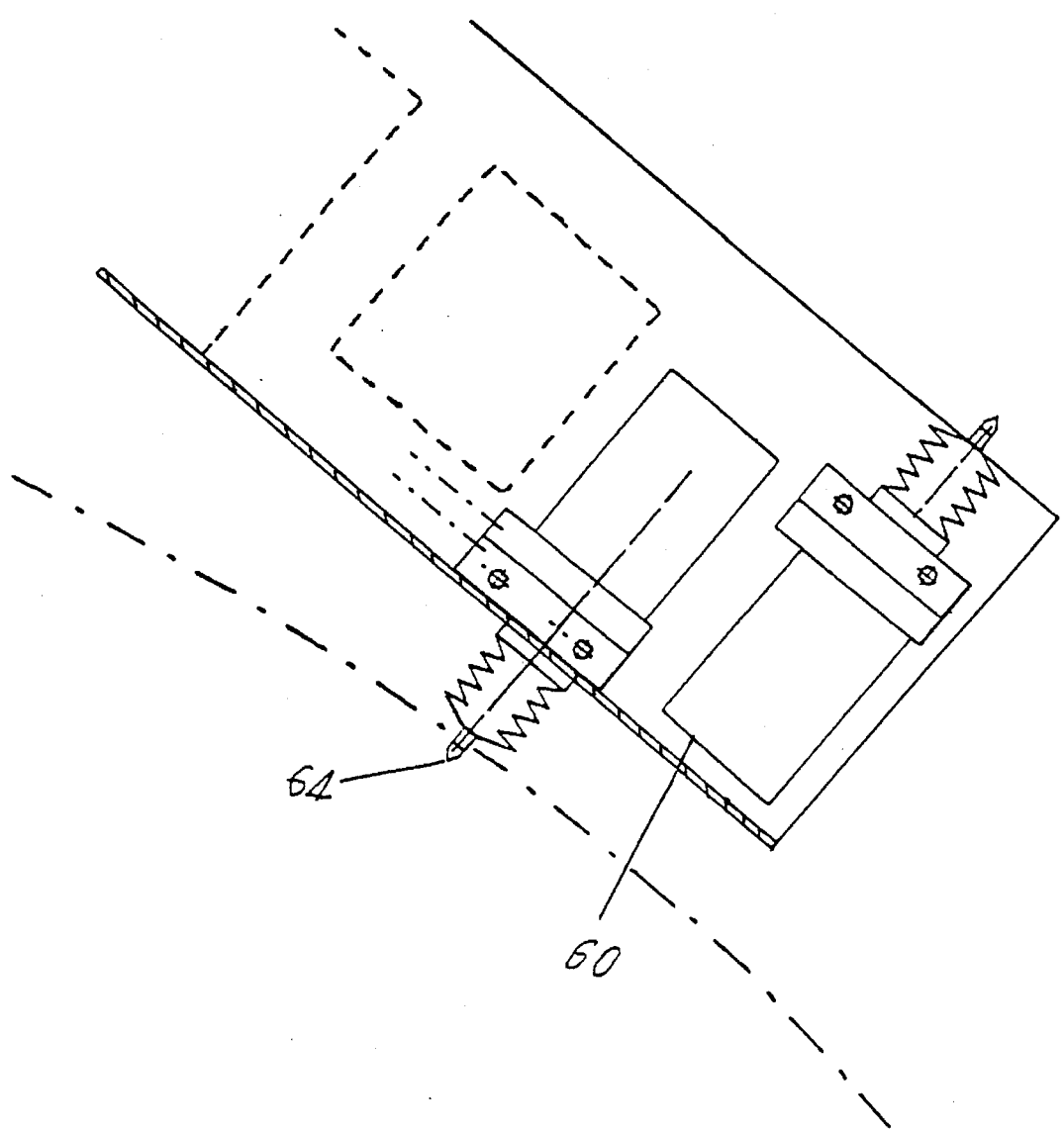
FIG. 5 is an enlarged detailed view of the end of one caliper arm of the assembly in FIG. 4.

A second preferred embodiment is illustrated in FIGS. 4 and 5. All features, except the location of the surface inspecting device and the associated contact probe are the same as in the first embodiment and are similarly located. For these, the same references are used. Therefore, only the area associated with the surface inspecting device is here described.

In this embodiment, the arms 20, 30 are generally flatter on their facing opposed sides so that they can be moved together, as seen in FIG. 4. Instead of the surface inspection device being disposed on the inward facing side of one arm 20, 30, the inspecting device 60 is disposed on the outward facing side 62 of the lower arm 30. A separate contact probe in the form of a roller 64 is positioned near to the inspecting device 60 on the outward side 62 of the arm 30, either along the arm 30 or on the arm next to the inspection device 60. With this embodiment, the surface inspection occurs at a different time than the measurement of the diameter of the workpiece. After the diameter has been measured, the frame 14 is swung outward to move the arms 30, 32 away from the workpiece so that the workpiece will not interfere with the arm 30. Then the arm 30 is raised until the outward side 62 of the arm 30 is above the workpiece, the frame is swung inward to move the arm 30 over the workpiece, and the arm 30 is lowered to bring the roller 64 against the workpiece which spaces the inspecting device 60 at a distance which permits adequate inspection. While a grinding process is performed, the inspecting device remains in position to inspect the workpiece surface.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A caliper assembly for a grinding apparatus, the caliper assembly comprising:

a pair of caliper arms and means supporting the caliper arms to extend past opposite sides of a workpiece, means on the caliper arms to measure a dimension of the workpiece;

the caliper arms have inward facing sides which are opposed when the arms are in position to straddle the workpiece;

the caliper arms have opposite outward facing sides; a surface inspecting device disposed on the outward facing side of one of the caliper arms for inspecting a surface characteristic of the workpiece surface.

2. The caliper assembly of claim 1, wherein the one caliper arm is independently movable relative to the other caliper arm to adjust the location of the surface inspecting device.

3. The caliper assembly of claim 1, wherein the dimension measuring means located on each of the caliper arms includes means for contacting the workpiece surface and includes means for measuring the distance between the contacting means for thereby measuring a dimension of the workpiece.

4. The caliper assembly of claim 1, wherein the supporting means comprises a support arm and the pair of caliper arms are movably mounted on the support arm so as to move relative to the workpiece surface.

5. The caliper assembly of claim 1, wherein the one caliper arm is independently movable relative to the other caliper arm to adjust the location of the surface measuring device to maintain a uniform distance between the surface inspecting device and the workpiece surface during inspecting of the workpiece surface.

6. The caliper assembly of claim 1, wherein the fixed distance between the surface inspecting device and the workpiece surface is within a range of about 2 to 3 mm.

7. A grinding apparatus comprising:
   a workpiece holding device for holding a workpiece in position during inspecting of the workpiece surface; and
   a caliper assembly according to claim 1.

8. The caliper assembly of claim 1, wherein the surface inspecting device comprises at least one transducer for detecting surface characteristics of the workpiece.

9. The caliper assembly of claim 4, wherein the support arm is pivotally mounted on the grinding apparatus to pivot between a non-measuring position with the caliper arms away from opposite sides of the workpiece and a measuring position with the caliper arms at opposite sides of the workpiece.

10. The grinding apparatus of claim 7, wherein the surface inspecting device comprises at least one transducer out of contact with the workpiece for detecting surface characteristics of the workpiece.

11. A caliper assembly for a grinding apparatus, the caliper assembly comprising:
    a pair of caliper arms and means supporting the caliper arms to extend past opposite sides of a workpiece, the caliper arms have inward facing sides which are opposed when the arms are in position to straddle the workpiece, dimension measuring means located on each of the caliper arms including means for contacting the workpiece surface and means for measuring the distance between the contacting means for thereby measuring a dimension of the workpiece and
    a surface inspecting device located on the inward facing side of one of the caliper arms and also outward beyond the dimension measuring means on the one caliper arm, the inspecting device being for inspecting a surface characteristic of the workpiece surface, the inspecting device is supported on the one caliper arm such that the inspecting device does not contact the workpiece and such that the surface inspecting device is located at a desired, fixed distance from the workpiece surface when the dimension measuring means is in contact with the workpiece surface.

12. The caliper assembly of claim 11, wherein the surface inspecting device is located adjacent to the dimension measuring means.

13. The caliper assembly of claim 11, wherein the surface inspecting device comprises at least one transducer for detecting surface characteristics of the workpiece.

14. The caliper assembly of claim 11, wherein the fixed distance between the surface inspecting device and the workpiece surface is within a range of about 2 to 3 mm.

15. The caliper assembly of claim 11, further comprising an additional surface inspecting device located on the other of the caliper arms for inspecting surface characteristics of the workpiece.

16. The caliper assembly of claim 11, wherein the surface inspecting device comprises at least one transducer out of contact with the workpiece for detecting surface characteristics of the workpiece.

* * * * *